United States Patent [19]

Shibata et al.

[11] Patent Number: 4,748,517
[45] Date of Patent: May 31, 1988

[54] PCM AUDIO SIGNAL REPRODUCING APPARATUS

[75] Inventors: Masahiro Shibata, Tokyo; Tatsuo Tsujibayashi; Hiroyuki Sato, both of Kanagawa; Yoshinori Machida; Daisuke Murakami, both of Tokyo; Yoko Ohgane, Kanagawa, all of Japan

[73] Assignee: Sony Corporation, Tokyo, Japan

[21] Appl. No.: 875,538

[22] Filed: Jun. 18, 1986

[30] Foreign Application Priority Data

Jun. 18, 1985 [JP] Japan ................... 60-132640

[51] Int. Cl.[4] .................. H04N 9/79; H04N 5/78
[52] U.S. Cl. ....................... 358/310; 358/343; 360/19.1
[58] Field of Search ............ 358/310, 341, 343, 165, 358/33; 360/19.1, 32

[56] References Cited

U.S. PATENT DOCUMENTS

| 4,542,418 | 9/1985 | Yoneyama et al. | 358/343 |
| 4,542,419 | 9/1985 | Morio et al. | 358/343 |
| 4,551,771 | 11/1985 | Machida et al. | 360/19.1 |

Primary Examiner—L. T. Hix
Assistant Examiner—David M. Gray
Attorney, Agent, or Firm—Alvin Sinderbrand

[57] ABSTRACT

In an apparatus for reproducing either a video signal or a PCM (pulse code modulated) audio signal from a record medium, the existence of a PCM audio signal recorded on the record medium is detected in response to an identifying pilot signal recorded together with the PCM audio signal, and, when a video signal is being reproduced, detection of a PCM audio signal is obviated. Thus, even if the identifying pilot signal and a portion of the video signal are superposed upon each other on a frequency axis, erroneous assumption of the presence of a recorded PCM audio signal can be avoided to prevent incorrect reproducing operation.

21 Claims, 5 Drawing Sheets

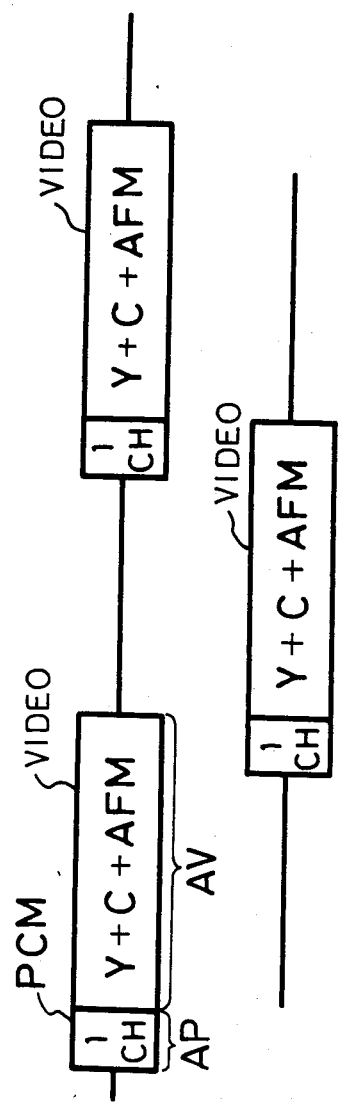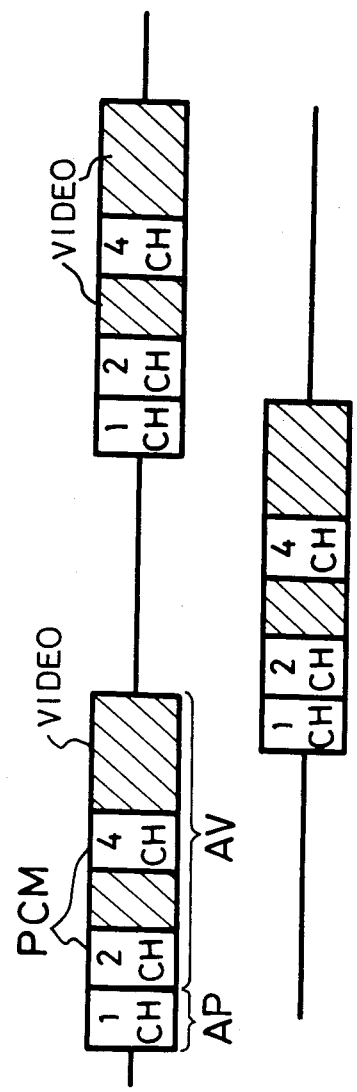
FIG. 6A  FIG. 6B  FIG. 6C  FIG. 6D

PCM AUDIO SIGNAL REPRODUCING APPARATUS

BACKGROUND OF THE INVENTION

1. Field of the Invention

This invention relates to a PCM (pulse code modulated) audio signal reproducing apparatus, and more particularly is directed to an 8 mm video tape recorder also adapted for recording a PCM audio signal.

2. Description of the Prior Art

Standardization of a co-called 8 mm video tape recorder has been proposed. According to such standardization represented generally in U.S. Pat. No. 4,551,771 having a common assignee herewith, the recording and/or reproducing of a video signal on and/or from a magnetic tape is carried out by first and second rotary magnetic heads which are mounted on a rotary tape guide drum at respective locations having an angular spacing of 180° therebetween. The magnetic tape is helically wrapped around the periphery of the tape guide drum over an angular range of 221° and is normally transported longitudinally so that the rotary heads alternately scan skewed or slant tracks on the tape. In an interval of 180° within the tape wrapping angle of 221°, the rotary heads normally record or reproduce a video signal in the skewed tracks on the magnetic tape. In the remaining interval of 36°, that is, an overscan section of each track, an audio signal, which is pulse-code-modulated and time-base-compressed, is recorded on and/or reproduced from the magnetic tape by the same rotary.

Alternatively, and as disclosed in detail in U.S. Pat. No. 4,542,419 which also has a common assignee herewith, it is possible to establish a so-called audio-use mode in which the area of each track corresponding to the angular range of 180° is divided equally by 5 and the PCM audio signal may also be recorded in a selected one of these divided portions during scanning of each track. More specifically, the whole area of each track is divided into 6 segments each corresponding to an angular range of 3620 , and first to sixth track channels are formed by the similarly situated segments of the respective skewed tracks, whereby the PCM audio signal can be recorded in any desired track channel.

Upon reproducing operation of the 8 mm video tape recorder, it is necessary to determine whether the tape being played is a so-called video tape or a multi-channel PCM tape. If it is a multi-channel PCM tape, it is desirable to cut-off or mute the monitor picture. For example, if a PCM audio signal is recorded in one of the channels of the tape on the area of the tape in which the video signal would otherwise be recorded, a noise bar of band-shape corresponding to the PCM audio signal recording area appears on the reproduced picture displayed by the monitor. If it can be determined that a PCM audio signal is recorded on the multi-channel PCM recording area, such strange picture or display can be avoided by muting the video signal to the monitor.

As one of the methods for identifying a tape on which there is a multi-channel PCM recording, it has been proposed that an identifying pilot signal in the form of a continuous wave having a suitable frequency, for example, 228.748 kHz, be recorded on the PCM audio signal recording area in a frequency multiplexed manner.

When such tape having a multi-channel PCM audio recording thereon is reproduced, in which case a video signal is not reproduced, it would be useless to detect the presence or absence of a high frequency video signal in the reproduced signal for controlling a muting circuit of the video signal reproducing circuit. In other words, when the video signal is not recorded on the tape but a PCM audio signal is recorded on the tape in the multi-channel PCM audio format, such state may be mistaken as a case in which the video signal is recorded and, therefore, the muting circuit of the video signal reproducing circuit can not be operated to mute the video signal.

OBJECTS AND SUMMARY OF THE INVENTION

Accordingly, it is an object of this invention to provide an improved PCM audio signal reproducing apparatus.

It is another object of this invention to provide an improved PCM audio signal reproducing apparatus which can prevent a PCM audio signal recorded in the multi-channel PCM are from being mistaken as a video signal.

According to an aspect of the present invention, there is provided an apparatus for reproducing an information signal comprising at least a digitized audio signal recorded in at least an overscan section of a plurality of successive tracks on a record medium, said apparatus comprising: transducer means for scanning the tracks to reproduce the information signal recorded in the plurality of successive tracks, audio signal processing means for converting said digitized audio signal to an analog audio signal, video signal processing means for processing any video signal included in the reproduced information signal to provide a composite output color video signal having horizontal synchronizing pulses and color burst signals, switch means for supplying the information signal reproduced during scanning of the overscan section of each track to said audio signal processing means and for supplying the information signal reproduced during scanning of a main section or area of each track to either the audio signal processing means or the video signal processing means, video signal muting means for muting the video signal produced from said video signal processing means, video signal detecting means for detecting a video signal component included in said information signal reproduced during scanning of the main section of each track, and control means causing said video signal muting means to mute said output video signal produced from said video signal processing means in response to an output signal from said video signal detecting means indicating the absence of a video signal from a track being scanned.

The above, and other objects, features and advantages of the present invention, will become apparent from the following detailed description of the preferred embodiments taken in conjunction with the accompanying drawings, throughout which like reference numerals designate like elements and parts.

BRIEF DESCRIPTION OF THE DRAWINGS

FIGS. 6A to 6D show respective diagrams used to explain the effect of this invention.

DESCRIPTION OF THE PREFERRED EMBODIMENTS

Figure 1:
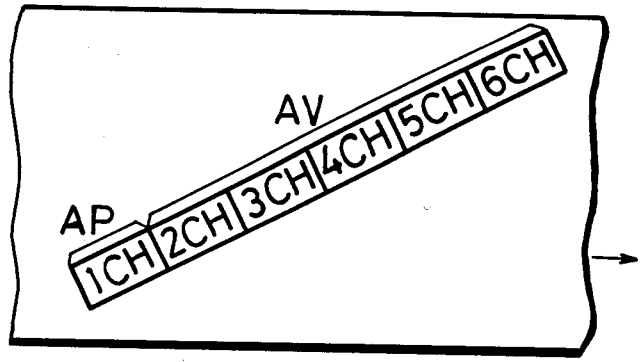
FIG. 1 is a schematic view of a section of a tape showing thereon the recording format of an 8 mm video tape recorder to which the present invention is applied.

First, the principle of the present invention will be briefly described above.

In an apparatus, such as a video tape recorder (VTR) which reproduces or plays back a record medium on which a video signal and/or a PCM audio signal are recorded in discontinuous tracks, a monitor picture must be cut off or muted when only a PCM audio signal is reproduced. Therefore, the described apparatus is provided with a muting circuit which is placed in a muting state when the absence of a recorded video signal is detected, for example, by sensing horizontal synchronizing signals and/or a chrominance signal of a video signal or a carrier signal of an FM (frequency-modulated) audio signal recorded with a video signal. Alternatively, the muting circuit for the video signal is placed in the muting state in response to detection of an identifying (ID) pilot signal . . . recorded . . . together with a multi-channel PCM audio signal on the tape.

In preferred embodiments of this invention, when the synchronizing signal in the video signal is not detected continuously over several field periods and an identifying signal recorded together with the multi-channel PCM audio signal is detected continuously over several field periods, the muting circuit for the video signal is operated to mute the video signal and thereby prevent an unpleasant display on the monitor.

Further, it may be possible that whether or not the PCM audio signal is recorded on the record medium is determined not by detecting the presence or absence of the identifying pilot signal, but by detecting a synchronizing pattern encoded with the PCM audio signal.

Referring now to the drawings, the present invention will hereinafter be described in detail.

Each track on a tape of an 8 mm video tape recorder to which the present invention is desirably applied has the format shown on FIG. 1 when acting as a multi-channel PCM audio tape recorder. As is well known, a video tape recorder of this type records in successive skewed tracks on the tape (only one track being shown) with each track including an area AV in which a video signal and an audio frequency modulated (AFM) signal are recorded during rotation of a rotary head through an angle of 180° and an overscan area AP in which a PCM audio signal is recorded by the same head during rotation through an angle of 36°. In this case, the video-+AFM area AV is further divided equally by 5 so that this 8 mm video tape recorded can be used as a six-channel PCM tape recorder.

Figure 2:
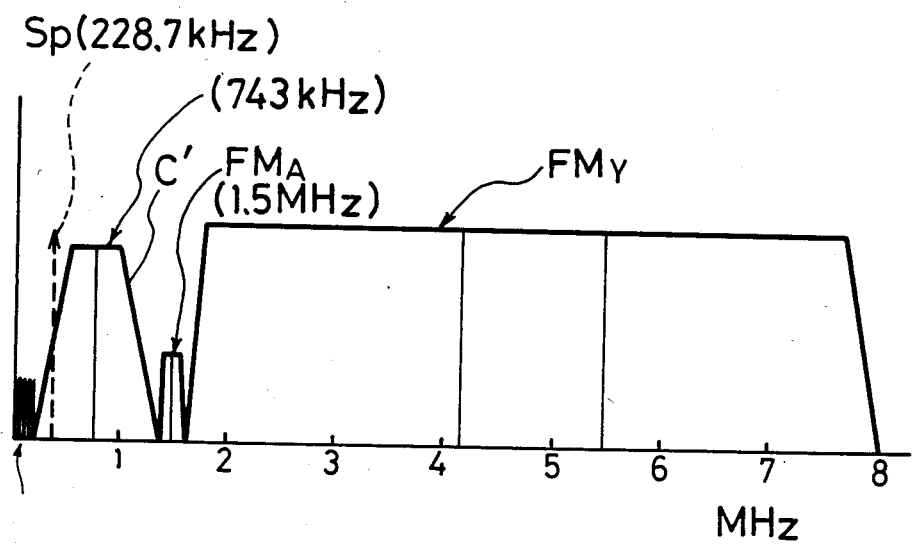
FIG. 2 is a diagrammatic view showing an example of a signal band of the 8 mm video tape recorder.

When the 8 mm video tape recorder is used as a video tape recorder, the recorded video signal includes, as shown in FIG. 2, an FM (frequency modulated) luminance signal $FM_Y$ (having a frequency deviation ranging from 4.2 to 5.4 MHz) and a low frequency converted chrominance signal C' having a frequency of 743 kHz and which are recorded with their signal bands separated, and an FM audio signal $FM_A$ having a center frequency of 1.5 MHz is inserted between these separate bands. Further, a 4-frequency system tracking pilot signal is inserted into the signal band below the chrominance signal C', that is, between 100 and 150 kHz.

Figure 3:
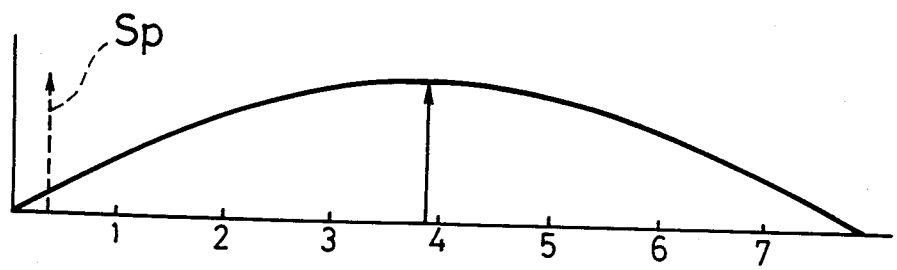
FIG. 3 is a diagrammatic view showing an example of a PCM signal band.

When the 8 mm video tape recorder is used as a multi-channel PCM audio tape recorder, the signal band has the spectrum shown on FIG. 3. As seen in FIG. 3, this signal band is wide, ranging from several kHz to several MHz, that is, more or less coextensive with the band of a recorded video signal. In order to discriminate between a tape on which the PCM audio signal is recorded in the multi-PCM mode and a tape on which the video signal is recorded, the identifying pilot signal $S_P$ having the frequency of 228.7 kHz is frequency multiplexed with the PCM audio signal. As shown on FIG. 2, the frequency of this identifying pilot signal $S_P$ is within a lower side band of the low frequency converted chrominance signal C' on a tape which is recorded by an 8 mm video tape recorder.

Figure 4:
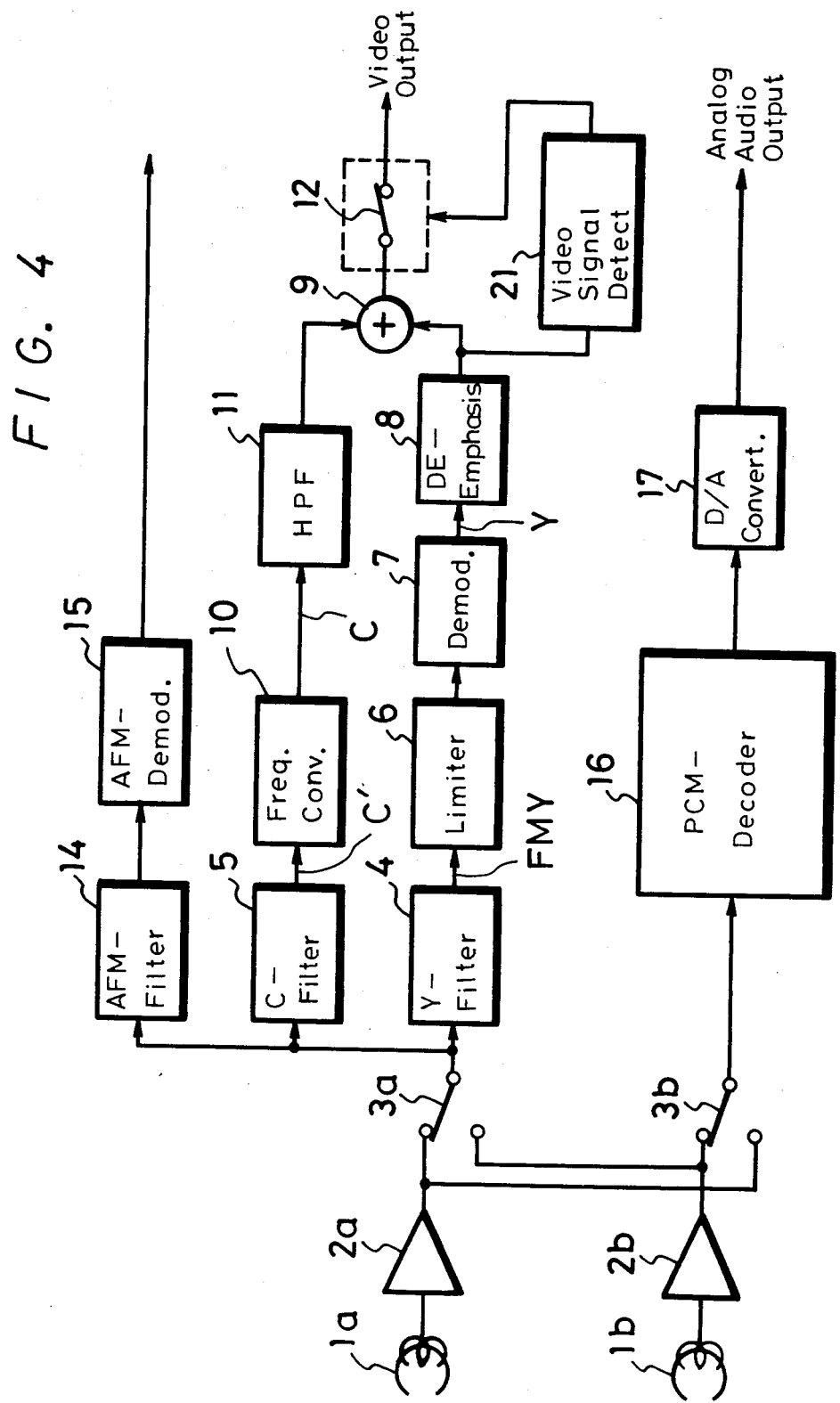
FIG. 4 is a block diagram showing an embodiment of a signal reproducing system of a PCM audio signal reproducing apparatus according to this invention.

Referring now to FIG. 4, it will be seen that, in a signal reproducing system of an 8 mm video tape recorder to which this invention is applied, output signals reproduced by first and second rotary heads 1a and 1b are respectively supplied through pre-amplifiers 2a and 2b to change-over switches 3a and 3b, by which the gathering of the multi-channel signals and the signal distribution thereof to the video signal reproducing system and to the PCM audio signal reproducing system are carried out.

In the video signal reproducing system, a luminance signal $FM_Y$ and a chrominance signal C' are separated from the reproduced video signal by filters 4 and 5, respectively. The luminance signal from filter 4 is supplied through a limiter 6 to a demodulator 7 and thereby demodulated. The demodulated luminance signal Y from demodulator 7 is supplied to a de-emphasis circuit 8 in which suitable corrections are effected in a high frequency band, and then supplied to one input of an adder 9. On the other hand, the chrominance signal C' from filter 5 is converted by a frequency converter 10 to a signal C having a frequency of 3.58 MHz, and then supplied through a high pass filter 11 to another input of adder 9 in which it is combined with the luminance signal Y and then delivered through a muting or cut-off switch 12 as a reproduced video signal.

Further, the FM audio signal $FM_A$ inserted intermediate the FM luminance signal band and the chrominance signal band is separated from the reproduced signal by an AFM filter 14, and then demodulated by an AFM demodulator 15 for delivery as a reproduced audio signal.

A reproduced PCM audio signal from the change-over switches 3a and 3b is demodulated by a PCM decoder 16, converted to an analog audio signal by a D/A (digital-to-analog) converter 17 and then delivered as the analog audio signal.

The output signal from the de-emphasis circuit 8 in the luminance signal reproducing system is also supplied to a video signal detecting circuit 21 which detects synchronizing signals, for example, horizontal synchronizing signals in the video signal, and counts the number of such synchronizing signals detected during the scanning of each track. If a video signal is recorded in the area AV of each track, the normal number of horizontal synchronizing signals, for example, 256, will be detected during scanning of each track, and circuit 21 will provide a low-level control signal by which switch 12 is maintained in its closed position. When the counted number of the synchronizing signals is less than the normal number (256), for example, when the tape has multi-channel PCM audio signals recorded in area AV, the output signal from detecting circuit 21 attains a high level. When the level of the output signal from detecting circuit 21 becomes high, muting switch 12 is opened or placed in the muting state to cut off or mute the monitor picture.

In the embodiment of a reproducing system according to the present invention shown in FIG. 5, parts corresponding to those described with reference to FIG. 4 are identified by the same reference numerals and will not be again described in detail because they have similar functions.

Figure 5:
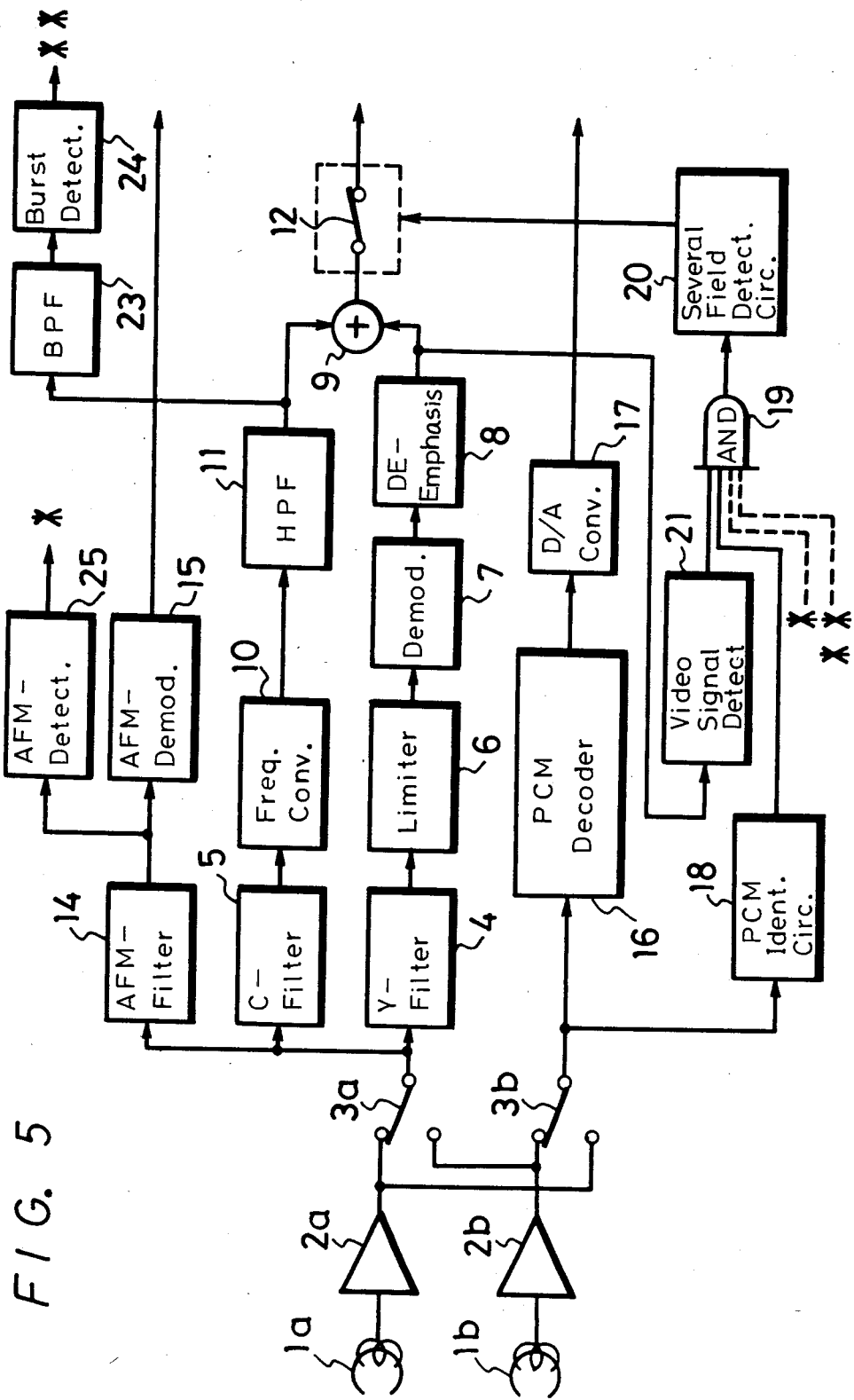
FIG. 5 is a block diagram showing other embodiments of the signal reproducing system of a PCM audio signal reproducing apparatus according to this invention.

In FIG. 5, the reproduced PCM audio signal from change-over switches 3a and 3b is supplied to the PCM decoder 16 and also to a PCM identifying circuit 18 which detects the identifying pilot signal $S_P$ multiplexed with the PCM audio signal. The detected output signal from this identifying circuit 18 and the output signal from detecting circuit 21 are both supplied to respective inputs of an AND circuit 19.

When identifying circuit 18 detects pilot signal $S_P$ and thereby senses the presence of a reproduced multi-PCM audio signal, the output signal of identifying circuit 18 becomes high. Further, when detecting circuit 21 does not detect the normal number of synchronizing signals from a video signal, the output signal of detecting circuit 21 becomes high. Accordingly, when both the output signals of identifying circuit 18 and detecting circuit 21 are high or logic "1", AND circuit 19 provides an output signal of high level.

The output signal from AND circuit 19 is delivered to a several-field detecting circuit 20. When the output signal of AND circuit 19 is continuously high over several field periods, detecting circuit 20 produces an output signal having a high level by which muting switch 12 is opened so as to be placed in the condition or state for muting the video signal.

It will be apparent from the above that, when the pilot signal $S_P$ of the multi-PCM audio signal is detected over several field periods and the video signal is not detected at all over several field periods, it is deemed that the tape is recorded in the multi-channel PCM mode. Thus, the monitor picture is cut off or muted.

Therefore, when multi-channel PCM audio signals are recorded in channels 1CH, 2CH and 4CH for a plurality of successive field periods, as shown in FIGS. 6C and 6D, on a tape which otherwise has the normal PCM audio signal recorded in channel 1CH and the video signal recorded in area AV, as shown in FIGS. 6A and 6B, and such tape is reproduced, the monitor picture is cut off or muted precisely when needed to avoid disturbing displays on the monitor.

Alternatively, as the means for detecting a video signal, it is possible to detect the presence or absence of the FM audio signal which is normally recorded together with the video signal. This alternative version of the detecting means will also be described with reference to FIG. 5. When a video signal is passed through switch 3a to the AFM filter 14, only the AFM signal is passed through filter 14 to an FM audio signal detecting circuit 25. Accordingly, whether or not a video signal is present on the tape being reproduced is judged by detecting circuit 25 on the basis of its detection of an AFM signal therein, and the detected output from the AFM detecting circuit 25, which is high when an AFM signal is absent, is supplied to AND circuit 19.

Furthermore, another alternative arrangement, also shown in FIG. 5, can be employed for detecting the video signal. In this arrangement, the chrominance component from filter 11 is supplied to a band pass filter 23 by which a burst signal contained in the video signal is extracted. Then, the extracted burst or output signal from band pass filter 23 is supplied to a burst signal detecting circuit 24 which provides a high level output when the burst signal is not present. The high level output from the burst signal detecting means 24 which indicates the absence of a video signal on the tape is also supplied to AND circuit 19.

Figure 7:
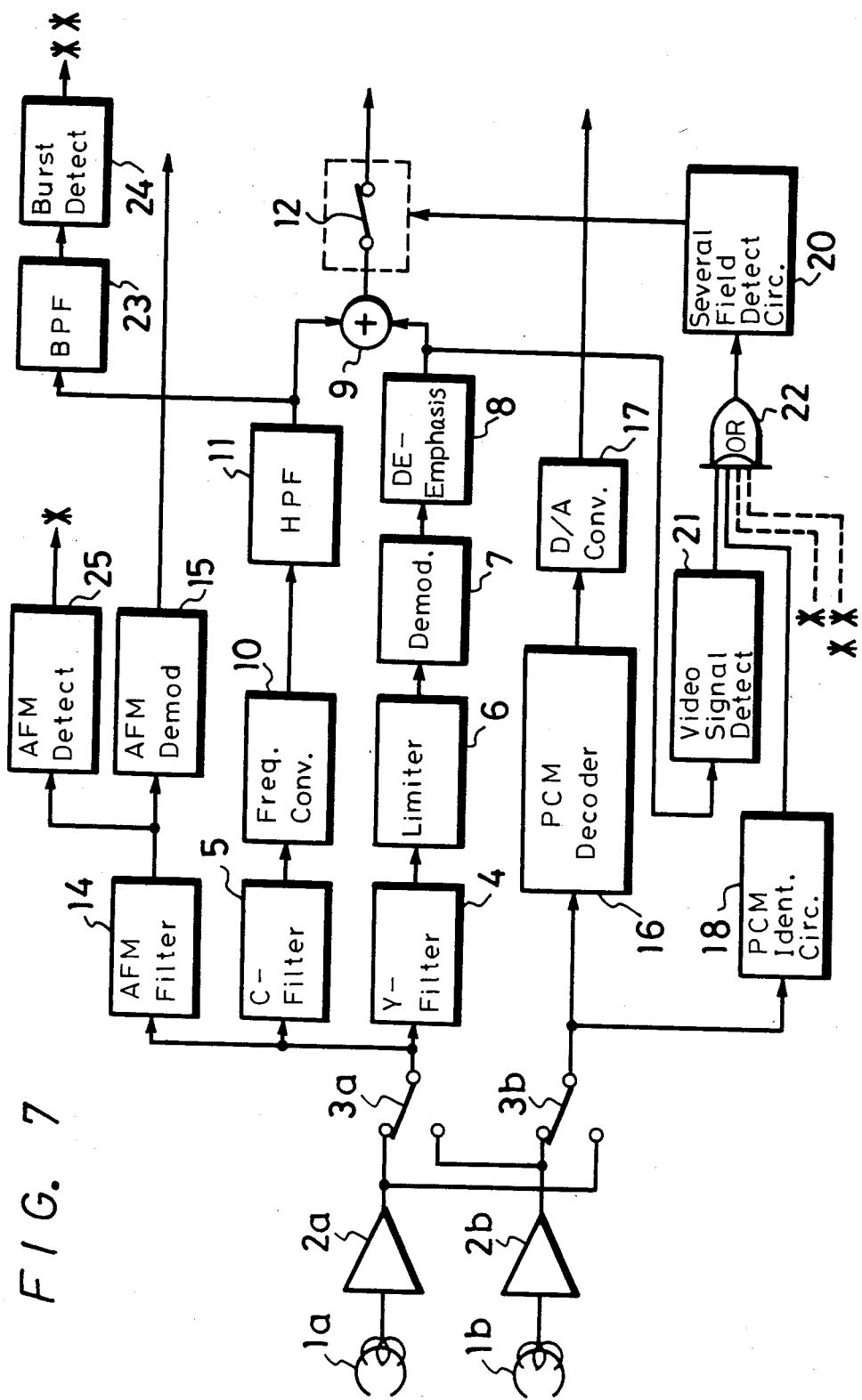
FIG. 7 is a block diagram showing still another embodiment of the signal reproducing system of a PCM audio signal reproducing apparatus according to this invention.

FIG. 7 shows a further embodiment of a reproducing system according to the present invention, and in which parts corresponding to those of FIGS. 4 and 5 are identified by the same reference numerals and will not be again described.

In the embodiment of FIG. 7, the AND circuit 19 of FIG. 5 is replaced by an OR circuit 22. Thus, at least the output signal from video signal detecting means 21 and the output signal from PCM identifying circuit 18 are supplied through OR circuit 22 to the several-field detecting circuit 20. The outputs of AFM detector 25 and of burst signal detector 24 may also be supplied through OR circuit 22 to several-field detecting circuit 20, as shown in dotted lines. Accordingly, when the absence of at least the video signal or the pesence of the PCM audio signal is detected for several fields, muting switch 12 is opened so as to be placed in the muting mode.

Although preferred embodiments of the invention have been described in detail above with reference to the accompanying drawings, it will be apparent that the invention is not limited to such embodiments, and that many modifications and variations could be effected therein by one skilled in the art without departing from the spirit or scope of the invention as defined in the appended claims.

What is claimed is:

1. Apparatus for reproducing an information signal recorded in a plurality of successive tracks on a record medium and comprising at least a digitized audio signal recorded in at least an overscan section of each track, said apparatus comprising:
    transducer means for scanning the tracks to reproduce the information signal recorded in the plurality of successive tracks;
    audio signal processing means for converting said digitized audio signal to an analog audio signal;
    video signal processing means for processing any color video signal included in the reproduced information signal to provide a composite color video output signal having horizontal synchronizing pulses and color burst signals;
    switch means for supplying said information signal reproduced during scanning of said overscan section of each track to said audio signal processing means and for supplying said information signal reproduced during scanning of a main section of each track to a selected one of said audio signal processing means and said video signal processing means;

video signal muting means for muting said composite color video output signal from said video signal processing means;

video signal detecting means for detecting any color video signal included in said information signal reproduced during scanning of said main section of each track; and control means causing said video signal muting means to mute said composite color video output signal from said video signal processing means in response to an output signal from said video signal detecting means indicating the absence of a color video signal from a track being scanned.

2. Apparatus according to claim 1; in which said control means includes means for delaying the muting of said composite color video output signal by said muting means until said output signal from said detecting means has indicated the absence of any color video signal from a plurality of said tracks scanned in succession.

3. Apparatus according to claim 2; in which said video signal detecting means detects said horizontal synchronizing pulses in said composite color video signal.

4. Apparatus according to claim 1; in which said video signal detecting means detects said horizontal synchronizing pulses in said composite color video signal.

5. Apparatus according to claim 1; in which said information signal further includes a carrier signal frequency-modulated with an audio signal and said frequency modulated carrier signal is frequency mixed with said video signal; and further comprising:

frequency-modulated carrier detecting means for detecting said frequency-modulated carrier signal; and said control means being responsive to an output signal from said frequency-modulated carrier detecting means indicating the absence of said carrier signal reproduced during scanning of said main section of each track; and control means causing said video signal muting means to mute said composite color video output signal from said video signal processing means in response to an output signal from said video signal detecting means indicating the absence of a color video signal from a track being scanned.

6. Apparatus according to claim 1; in which said control means includes means for delaying the muting of said composite color video output signal by said muting means until said output signal from said detecting means has indicated the absence of any color video signal from a plurality of said tracks scanned in succession.

7. Apparatus for reproducing an information signal recorded in a plurality of successive tracks on a record medium and comprising at least a digitized audio signal recorded in at least an overscan section of each track, said apparatus comprising:

transducer means for scanning the tracks to reproduce the information signal recorded in the plurality of successive tracks;

audio signal processing means for converting said digitized audio signal to an analog audio signal;

video signal processing means for processing any color video signal included in the reproduced information signal to provide a composite color video output signal having horizontal synchronizing pulses and color burst signals;

switch means for supplying said information signal reproduced during scanning of said overscan section of each track to said audio signal processing means and for supplying said information signal reproduced during scanning of a remaining main section of each track to a selected one of said audio signal processing means and said video signal processing means;

video signal muting means for muting said video output signal from said video signal processing means;

audio signal detecting means for detecting said digitized audio signal included in said information signal reproduced during scanning of each track; and control means causing said video signal muting means to mute said video output signal from said video signal processing means in response to an output signal from said audio signal detecting means indicating the presence of said digitized audio signal in the information signal recorded in the track being scanned.

8. Apparatus according to claim 7; in which said control means includes means for delaying the muting of said composite color video output signal by said muting means until said output signal from said audio signal detecting means has indicated the presence of said digitized audio signal in the information signal recorded in a plurality of said tracks scanned in succession.

9. Apparatus according to claim 7; in which said information signal further includes a pilot signal for identifying the presence of said digitized audio signal; and in which said audio signal detecting means includes pilot signal detecting means for providing an output signal upon detecting a pilot signal, and said control means responds to said output signal from said pilot signal detecting means to cause said muting means to mute said video output signal from said video signal processing means.

10. Apparatus for reproducing an information signal recorded in a plurality of successive tracks on a record medium and including at least a digitized audio signal recorded in at least an overscan section of each track, said apparatus comprising:

transducer means for scanning the tracks to reproduce the information signal recorded in the plurality of successive tracks;

audio signal processing means for converting said digitized audio signal to an analog audio signal;

video signal processing means for processing any color video signal included in the reproduced information signal to provide a composite color video output signal having horizontal synchronizing pulses and color burst signals;

switch means for supplying said information signal reproduced during scanning of the overscan section of each track to said audio signal processing means and for supplying said information signal reproduced during scanning of a remaining main section of each track to a selected one of said audio signal processing means and said video signal processing means;

video signal muting means for muting said video output signal from said video signal processing means;

video signal detecting means for detecting any color video signal included in said information signal reproduced during scanning of said main section of each track;

audio signal detecting means for detecting said digitized audio signal included in said information signal reproduced during scanning of each track; and control means causing said video signal muting means to mute said output video signal from said video signal processing means when said video signal detecting means senses the absence of said output video signal and said audio signal detecting means detects said digitized audio signal included in said information signal reproduced during scanning of a track.

11. Apparatus according to claim 10; in which said control means includes means for delaying the muting of said composite color video output signal by said muting means until said video signal detecting means has sensed the absence of any video signal in a plurality of said tracks scanned in succession and said audio signal detecting means detects said digitized audio signal in said information signal reproduced from said plurality of the tracks scanned in succession.

12. Apparatus according to claim 11; in which said video signal detecting means detects said horizontal synchronizing pulses in said composite color video signal.

13. Apparatus according to claim 10; in which said video signal detecting means detects said horizontal synchronizing pulses in said composite color video signal.

14. Apparatus according to claim 10; in which said information signal further includes a carrier signal frequency-modulated with an audio signal and being frequency mixed with said video signal; and further in which frequency-modulated carrier detecting means are provided for detecting the frequency-modulated carrier signal, and said control means is responsive to an output signal from said frequency-modulated carrier detecting means indicating the absence of said carrier signal frequency-modulated with an audio signal from a track being scanned to cause said muting means to mute said video output signal from said video signal processing means.

15. Apparatus according to claim 10; in which said information signal further includes a pilot signal for identifying the presence of said digitized audio signal; and in which said audio signal detecting means includes pilot signal detecting means for providing an output signal upon detecting a pilot signal, and said control means responds to said output signal from said pilot signal detecting means to cause said muting means to mute said video output signal from said video signal processing means.

16. Apparatus for reproducing an information signal recorded in a plurality of successive tracks on a record medium and comprising at least a digitized audio signal recorded in at least an overscan section of each track, said apparatus comprising:

transducer means for scanning the tracks to reproduce the information signal recorded in the plurality of successive tracks;

audio signal processing means for converting said digitized audio signal to an analog audio signal;

video signal processing means for processing any color video signal included in the reproduced information signal to provide a composite color video output signal having horizontal synchronizing pulses and color burst signals;

switch means for supplying said information signal reproduced during scanning of the overscan section of each track to said audio signal processing means and for supplying said information signal reproduced during scanning of a remaining main section of each track to a selected one of said audio signal processing means and said video signal processing means;

video signal muting means for muting said video output signal from said video signal processing means;

video signal detecting means for detecting said video signal component included in said information signal reproduced during scanning of said main section of each track;

audio signal detecting means for detecting said digitized audio signal included in said information signal reproduced during scanning of each track; and control means causing said video signal muting means to mute said output video signal from said video signal processing means in response to an output signal from at least one of said video signal detecting means and audio signal detecting means during scanning of each track, said output signal from the audio signal detecting means indicating the presence of said digitized audio signal and said output from the video signal detecting means indicating the absence of said output video signal.

17. Apparatus according to claim 16; in which said control means includes means for delaying the muting of said composite color video output signal by said muting means until said video signals from said video and audio detecting means have indicated the absence of any color video signal from a plurality of said tracks scanned in succession or the presence of said digitized audio signal in each of said plurality of tracks.

18. Apparatus according to claim 17; in which said video signal detecting means detects said horizontal synchronizing pulses in said composite color video signal.

19. Apparatus according to claim 16; in which said video signal detecting means detects said horizontal synchronizing pulses in said composite color video signal.

20. Apparatus according to claim 16; in which said information signal further includes a carrier signal frequency-modulated with an audio signal and said frequency modulated carrier signal is frequency mixed with said video signal; and further in which frequency-modulated carrier detecting means are provided for detecting said frequency-modulated carrier signal, and said control means is responsive to an output signal from said frequency-modulated carrier detecting means indicating the absence of said carrier signal frequency-modulated with an audio signal from a track being scanned to cause said muting means to mute said video output signal from said video signal processing means.

21. Apparatus according to claim 16; in which said information signal further includes a pilot signal for the presence of said digitized audio signal in the respective track on said record medium; and in which said audio detecting means includes pilot signal detecting means for providing an output signal upon detecting a pilot signal, and said control means responds to said output signal from said pilot signal detecting means to cause said muting means to mute said video output signal from said video signal processing means.

* * * * *